United States Patent
Chung et al.

(10) Patent No.: US 8,090,807 B2
(45) Date of Patent: *Jan. 3, 2012

(54) HOME CODE SETTING METHOD FOR HOME NETWORK SYSTEM

(75) Inventors: Jong-Hoon Chung, Gunpo-shi (KR); Jun-Wan Bang, Seoul (KR); Geun-Chang Do, Ohsan-shi (KR); Sang-Kyun Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 848 days.

This patent is subject to a terminal disclaimer.

(21) Appl. No.: 11/655,825

(22) Filed: Jan. 22, 2007

(65) Prior Publication Data

US 2007/0174382 A1 Jul. 26, 2007

(30) Foreign Application Priority Data

Jan. 23, 2006 (KR) .................. 10-2006-0006836
Jul. 18, 2006 (KR) .................. 10-2006-0066975
Jul. 18, 2006 (KR) .................. 10-2006-0066976

(51) Int. Cl.
*G06F 15/177* (2006.01)

(52) U.S. Cl. ........ 709/222; 709/203; 709/219; 709/228; 709/238; 709/242; 709/245

(58) Field of Classification Search .................. 709/203, 709/219, 222, 228, 238, 242, 245, 205, 220, 709/227, 244, 250, 248

See application file for complete search history.

(56) References Cited

U.S. PATENT DOCUMENTS

| | | | | |
|---|---|---|---|---|
| 5,920,701 A | * | 7/1999 | Miller et al. | 709/228 |
| 6,549,933 B1 | * | 4/2003 | Barrett et al. | 709/203 |
| 6,922,728 B2 | * | 7/2005 | Cho | 709/227 |
| 6,934,269 B1 | * | 8/2005 | Hasha et al. | 370/312 |
| 6,954,790 B2 | * | 10/2005 | Forslow | 709/227 |
| 7,035,257 B2 | * | 4/2006 | Vafaei | 370/389 |
| 7,089,293 B2 | * | 8/2006 | Grosner et al. | 709/217 |
| 7,092,943 B2 | * | 8/2006 | Roese et al. | 1/1 |
| 7,096,490 B2 | * | 8/2006 | Xiong et al. | 726/3 |
| 7,136,928 B2 | * | 11/2006 | Saito et al. | 709/230 |
| 7,313,384 B1 | * | 12/2007 | Meenan et al. | 455/410 |

(Continued)

FOREIGN PATENT DOCUMENTS

KR  1020040047630 A  6/2004

(Continued)

*Primary Examiner* — Michael Won
(74) *Attorney, Agent, or Firm* — McKenna Long & Aldridge LLP

(57) ABSTRACT

The present invention discloses a home code setting method for a home network system which can overcome a spatial installation limit and improve reliability of network connection. The home code setting method for the home network system includes the steps of connecting a network server to one network, searching for a network at a network device, and when one network is searched for in the search step, performing, at the network device, connection or registration to the network server connected to the network.

7 Claims, 9 Drawing Sheets

U.S. PATENT DOCUMENTS

| | | | |
|---|---|---|---|
| 7,346,344 B2* | 3/2008 | Fontaine | 455/418 |
| 7,356,614 B2* | 4/2008 | Kim et al. | 709/245 |
| 7,359,988 B2* | 4/2008 | Kim et al. | 709/245 |
| 7,359,989 B2* | 4/2008 | Orava et al. | 709/245 |
| 7,411,952 B2* | 8/2008 | Saito et al. | 370/389 |
| 7,539,739 B2* | 5/2009 | Murakami et al. | 709/220 |
| 7,561,549 B2* | 7/2009 | Meier et al. | 370/331 |
| 7,564,804 B2* | 7/2009 | Lee | 370/255 |
| 7,617,317 B2* | 11/2009 | Jones et al. | 709/227 |
| 7,653,379 B1* | 1/2010 | Meenan et al. | 455/410 |
| 7,660,892 B2* | 2/2010 | Choong et al. | 709/224 |
| 7,917,663 B2* | 3/2011 | Choi et al. | 710/10 |
| 2002/0019880 A1* | 2/2002 | Sakakura | 709/245 |
| 2002/0188867 A1* | 12/2002 | Bushey et al. | 713/201 |
| 2003/0055923 A1* | 3/2003 | Kim et al. | 709/220 |
| 2003/0135626 A1* | 7/2003 | Ray et al. | 709/228 |
| 2005/0086332 A1* | 4/2005 | Nakazawa | 709/228 |
| 2005/0165719 A1* | 7/2005 | Greenspan et al. | 707/1 |
| 2006/0072491 A1* | 4/2006 | Simons | 370/328 |
| 2006/0106918 A1* | 5/2006 | Evert et al. | 709/220 |
| 2006/0253559 A1* | 11/2006 | Espina Perez et al. | 709/222 |
| 2006/0253611 A1* | 11/2006 | Hu et al. | 709/245 |
| 2007/0275717 A1* | 11/2007 | Edge et al. | 455/434 |
| 2008/0044006 A1* | 2/2008 | Kitagawa | 379/433.01 |
| 2009/0248797 A1* | 10/2009 | Chiba et al. | 709/203 |

FOREIGN PATENT DOCUMENTS

| | | |
|---|---|---|
| KR | 1020040103367 A | 12/2004 |
| KR | 1020040104349 A | 12/2004 |
| KR | 1020060045122 A | 5/2006 |
| KR | 1020060045123 A | 5/2006 |
| WO | WO 2010-192729 | 1/1999 |

* cited by examiner

HOME CODE SETTING METHOD FOR HOME NETWORK SYSTEM

This application claims the benefit of Korean Patent Application Nos. 10-2006-0006836 filed on Jan. 23, 2006, 10-2006-0066975 filed on Jul. 18, 2006 and 10-2006-0066976 filed on Jul. 18, 2006, which is hereby incorporated by reference for all purposes as if fully set forth herein.

TECHNICAL FIELD

The present invention relates to a home code setting method for a home network system, and more particularly, to a home code setting method for a home network system which can overcome a spatial installation limit and improve reliability of network connection.

BACKGROUND ART

A general network system uses a dependent transmission medium such as power line communication, Zigbee and RF to solve a wiring problem in an installation space and improve mobility. In addition, the network system using the dependent transmission medium such as the power line communication, Zigbee and RF divides networks (for example, households) by using network identifiers (home codes, etc.).

FIG. 1 is a block diagram illustrating the configuration of the general network system using the dependent transmission medium. Referring to FIG. 1, a household H1 and a household H2 are physically connected to each other through the power line which is the dependent transmission medium.

The household H1 is a network system composed of a network server 1a and electric home appliances 2a and 2b. The household H2 is a network system composed of a network server 1b and an electric home appliance 2c. When it is presumed that 0x11 is set as a home code of the household H1 and 0x01 is set as a home code of the household H2, a method for connecting a new electric home appliance 2d to the network system of the household H2 will now be explained.

In general, when a network identifier such as the home code is set, any home code is not stored in the electric home appliance 2d. When the electric home appliance 2d receives power, namely, when the electric home appliance 2d is connected to the power line, it receives the home code from the network server 1b, and sets the home code, thereby connecting the network. That is, the electric home appliance 2d is registered in the network of the household H2 and controlled by the network server 1b.

In the above network connection method, when the household H1 and the household H2 intend to connect new electric home appliances to the networks almost at the same time, if the electric home appliance 2d receives the home code 0x11 of the household H1 before receiving the home code 0x01 of the household H2, the electric home appliance 2d sets the home code 0x11 as its home code. The electric home appliance 2d is controlled by not the network server 1b but the network server 1a, which causes a serious security problem.

This problem is not confined to the power line communication. It occurs in every network system using the dependent transmission media.

In the network system using the dependent transmission medium, if the network server 1b is quite distant from the network device 2d, the user must input network connection inputs to the network server 1b and the network device 2d, respectively. It takes a time for the user to move between the network server 1b and the network device 2d. As a result, the security problem grows more serious. Furthermore, the user must repeatedly move between the network server 1b and the network device 2d to make the inputs and check the network connection.

DISCLOSURE OF THE INVENTION

The present invention is achieved to solve the above problems. An object of the present invention is to provide a home code setting method for a home network system, a network device and a network adapter which can attain highly reliable network connection and registration in a network system using a dependent transmission medium.

Another object of the present invention is to provide a home code setting method for a home network system, a network device and a network adapter which can stably perform network connection by a minimum operation of the user.

Yet another object of the present invention is to provide a home code setting method for a home network system, a network device and a network adapter which can easily process network connection by reducing a moving distance of the user.

In order to achieve the above-described objects of the invention, there is provided a home code setting method for a home network system, including the steps of: connecting a network server to one network; searching for a network at a network device; and when one network is searched for in the search step, performing, at the network device, connection or registration to the network server connected to the network.

There is also provided a network device, including: an input means for acquiring an input for a network join start request from the user; a network adapter for searching for a network, and performing network connection to a single network; and a control means for transmitting the network join start request to the network adapter to perform the network connection.

In addition, there is provided a network adapter, including: a search means for searching for a network; and a registration means for performing network connection or registration according to the number of the searched networks.

BRIEF DESCRIPTION OF THE DRAWINGS

The present invention will become better understood with reference to the accompanying drawings which are given only by way of illustration and thus are not limitative of the present invention, wherein.

BEST MODE FOR CARRYING OUT THE INVENTION

A home code setting method for a home network system in accordance with the preferred embodiments of the present invention will now be described in detail with reference to the accompanying drawings.

Figure 1:
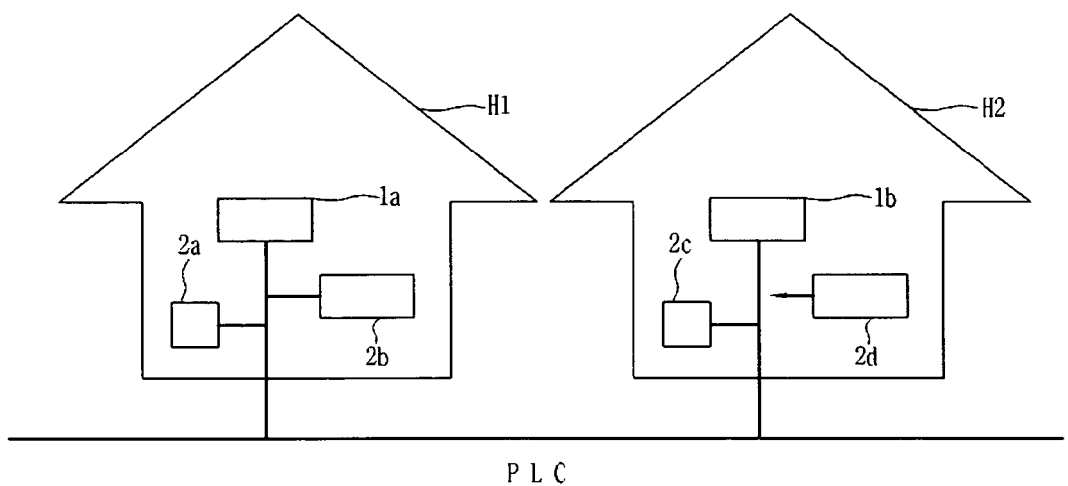
FIG. 1 is a block diagram illustrating a general network system using a dependent transmission medium.
Figure 2:
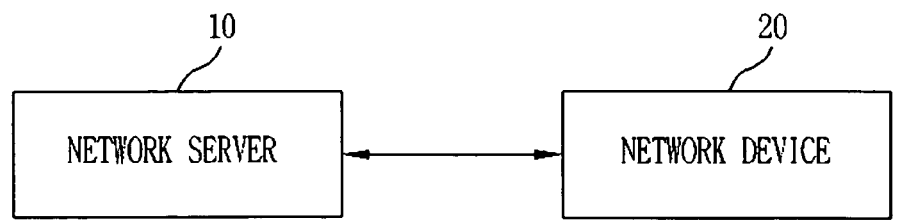
FIG. 2 is a concept diagram illustrating a home network system to which a network device is applied in accordance with one embodiment of the present invention.
Figure 3:
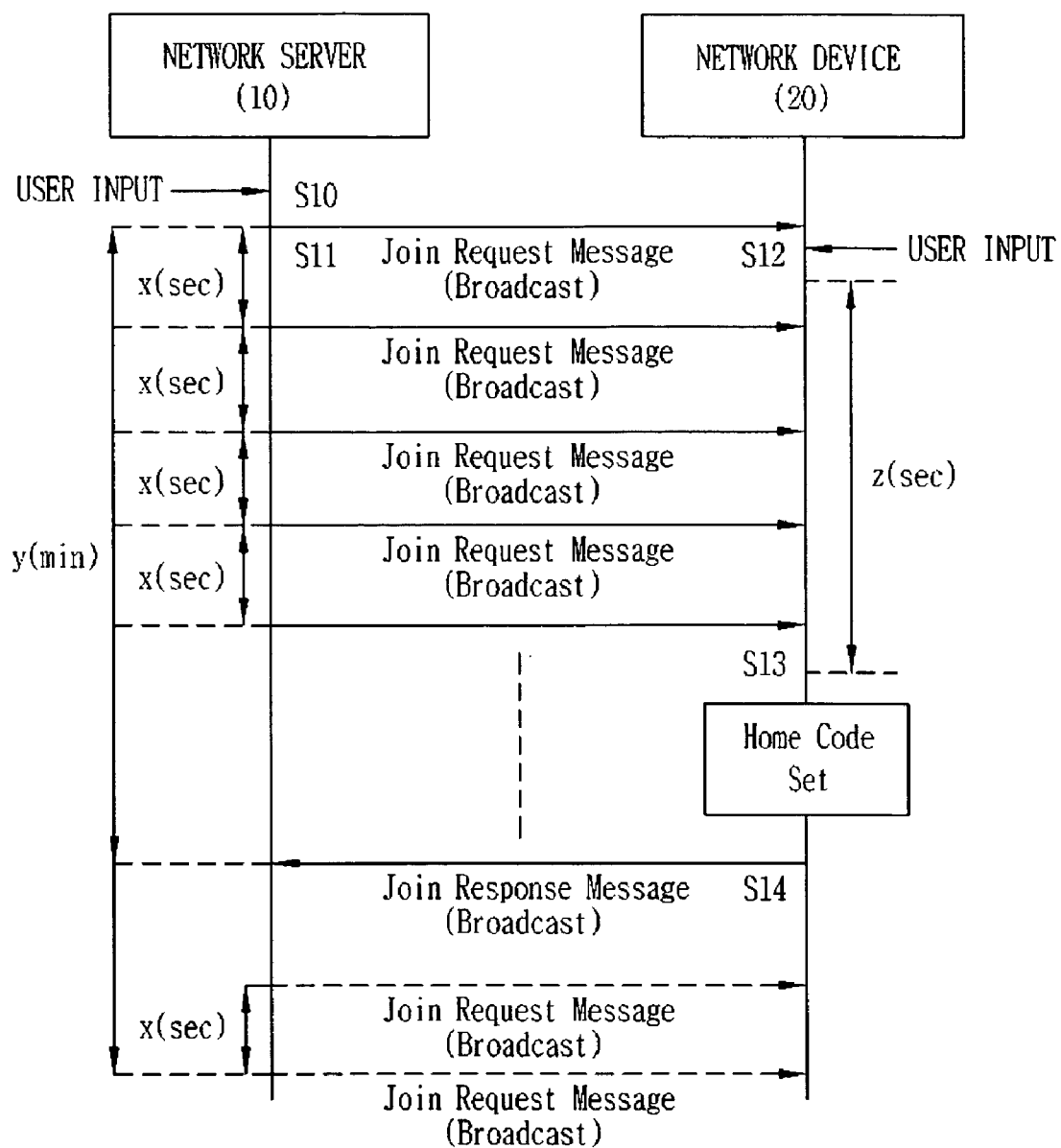
FIG. 3 is an exemplary view illustrating a first example of a home code setting method for the home network system of FIG. 2.
Figure 4:
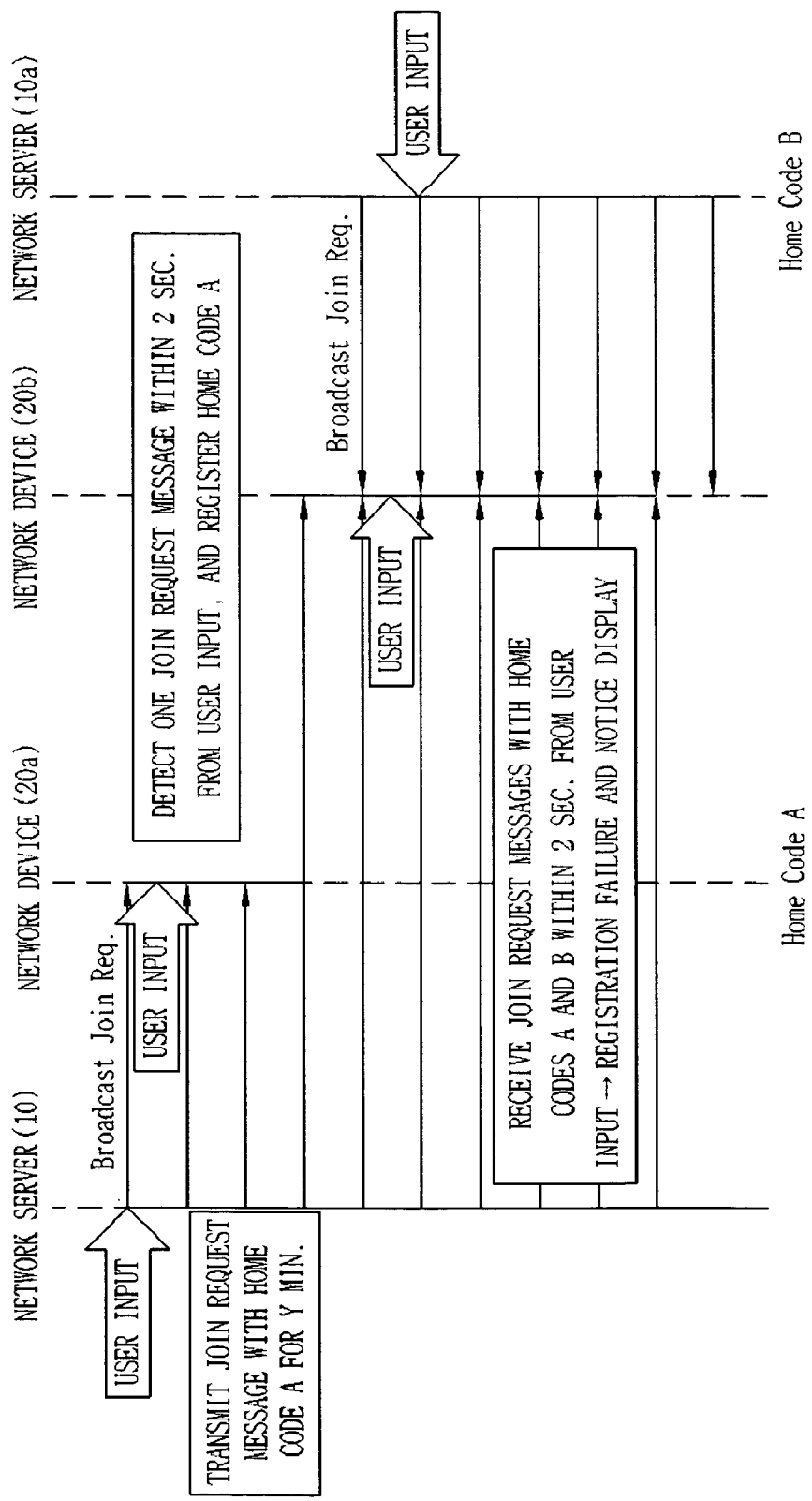
FIG. 4 is an exemplary view illustrating a second example of the home code setting method for the home network system of FIG. 2.

FIG. 2 is a concept diagram illustrating a home network system to which a network device is applied in accordance with one embodiment of the present invention, FIG. 3 is an exemplary view illustrating a first example of a home code setting method for the home network system of FIG. 2, and FIG. 4 is an exemplary view illustrating a second example of the home code setting method for the home network system of FIG. 2.

As illustrated in FIG. 2, the home network system includes a network server 10 for controlling and monitoring devices in a predetermined region, and a network device 20 for performing communication through a dependent transmission medium.

FIG. 3 shows the first example of the home code setting method. For example, in a state where a new network device 20 such as a microwave oven with a modem (network adapter described later) accesses the home network system, when the user intends to set an intrinsic home code given to his/her household or the network server 10 in the new network device 20, the user inputs a hot key of the network server 10, for example, a home code setting key.

On the other hand, when the network server 10 receives the home code setting key from the user (S10), the network server 10 generates a join request message containing the intrinsic home code of the household, and transmits the join request message in a broadcast method through the network (S11). The network server 10 repeatedly transmits the join request message at intervals of a preset time (for example, x sec.).

In addition, the user inputs a hot key of the network device 20, for example, a home code setting key. When the network device 20 receives the home code setting key from the user (S12), the network device 20 repeatedly receives the join request message from the network server 10 for a predetermined time (for example, z sec.).

The network device 20 extracts the home codes from the received join request messages, and compares the extracted home codes. For example, if the extracted home codes are identical, the network device 20 decides that the normal home code (namely, wanted home code) has been repeatedly received from the network server 10 installed in the household, sets the home code (S13), and transmits a join response message to the network server 10 (S14).

While the network server 10 repeatedly transmits the join request message at intervals of the preset time (for example, x sec.), if the network server 10 receives the join response message from the network device 20, the network server 10 stops repeatedly transmitting the join request message.

When the network server 10 does not receive the join response message, if a preset time (for example, y min.) elapses, the network server 10 decides that an error has occurred, and automatically stops repeatedly transmitting the join request message.

Conversely, if any one of the extracted home codes is different from the others, the network device 20 decides that the home code has not been normally repeatedly received from the network server 10 installed in the household. Instead of performing the home code setting operation, the network device 20 displays a home code setting error so that the user can recognize generation of the error.

Accordingly, while the home code is set in the network device 20, even if a home code is mistakenly received from a network server (not shown) installed in another household, the home code is not set.

For example, as shown in FIG. 4, a network device 20a in which the user intends to set a home code repeatedly receives a join request message from the network server 10 for a predetermined time (for example, z sec.), extracts and compares the home codes (for example, Home Code A) contained in the received join request messages, decides that the home codes are identical, and performs the normal home code setting operation.

Conversely, a network device 20b in which the user intends to set a home code repeatedly receives a join request message from the network server 10 and a join request message from another network server 10a for a predetermined time (for example, z sec.).

The network device 20b compares the home codes (for example, Home Code A) contained in the join request messages from the network server 10 with the home codes (for example, Home Code B) contained in the join request messages from the network server 10a, and decides that the home codes are different. Instead of performing the home code setting operation using the received home codes, the network device 20b displays a home code setting error so that the user can recognize generation of the error. It is thus possible to efficiently prevent generation of the error in the home code setting operation.

Figure 5:
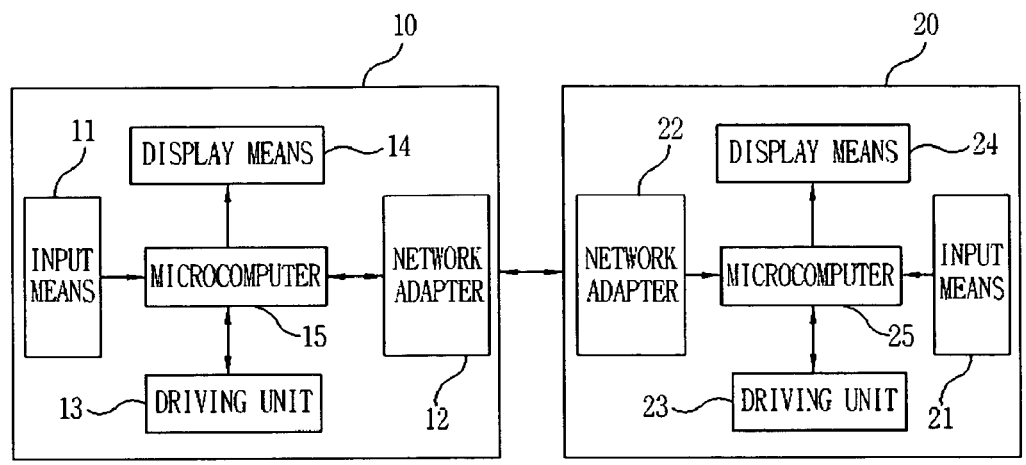
FIG. 5 is a block diagram illustrating a home network system to which a network device is applied in accordance with another embodiment of the present invention.

FIG. 5 is a block diagram illustrating a home network system to which a network device is applied in accordance with another embodiment of the present invention. The home network system includes a network server 10 for controlling and monitoring devices in a predetermined region, and a network device 20 for performing communication with the network server 10 through a dependent transmission medium.

The network server 10 includes an input means 11 for acquiring an input from the user, a network adapter 12 for performing communication according to a protocol based on the dependent transmission medium (for example, PLC, Zig-Bee, RF, etc.), a driving unit 13 for performing an individual function in addition to networking when the network server 10 is a refrigerator or a DTV, a display means 14 for notifying at least a network state to the user, and a microcomputer 15 for forming a predetermined network by controlling the network adapter 12 according to the user input.

An input means 21, a network adapter 22, a driving unit 23, a display means 24 and a microcomputer 25 of the network device 20 are equivalent in basic function to the input means 11, the network adapter 12, the driving unit 13, the display means 14 and the microcomputer 15 of the network server 10. The network adapter 22 performs a network security function, which will now be explained with reference to FIG. 6.

Figure 6:
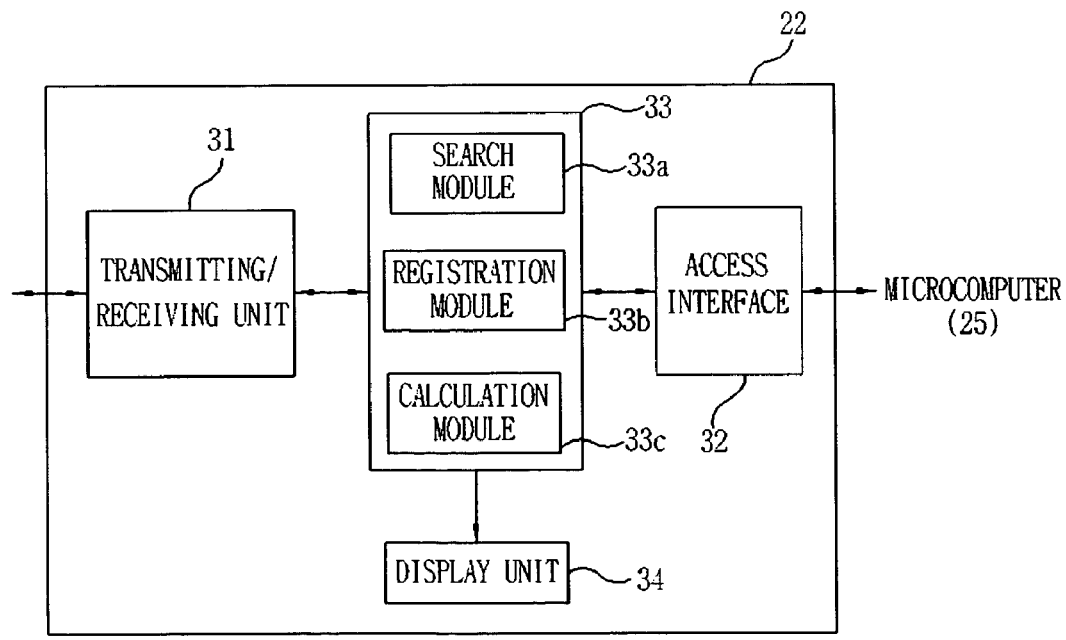
FIG. 6 is a block diagram illustrating a network adapter of FIG. 5.

FIG. 6 is a block diagram illustrating the network adapter of FIG. 5. As depicted in FIG. 6, the network adapter 22 includes a transmitting/receiving unit 31 for transmitting and receiving data through the dependent transmission medium, an access interface 32 for transmitting and receiving data to/from the microcomputer 25 of the network device 20, and a control unit 33 for performing communication control according to the protocol based on the dependent transmission medium. The network adapter 22 can further include a display unit 34 for displaying a network connection result.

In detail, although not illustrated, the transmitting/receiving unit 31 includes a modulation unit, a demodulation unit, an amplification unit, an antenna, etc. The detailed structure of the transmitting/receiving unit 31 is easily understood by the ordinary people in the art to which the present invention pertains.

The access interface 32 is an access means for transmitting and receiving data to/from the microcomputer 25. That is, the access interface 32 receives commands and data from the microcomputer 25, and transmits command processing results and data from the control unit 33.

The control unit 33 controls network connection according to a communication type based on the used protocol, and also controls the succeeding data transmission and reception. In accordance with the present invention, the process of the control unit 33 connecting the new network device 20 to the network controlled by the network server 10 will be described in detail.

The display unit 34 displays a power supply state or an operation state (normal operation, operation error, etc.) of the network adapter 22. If the network device 20 does not include a display means, the display unit 34 can display the network connection result. The display unit 34 can perform visual and audible display.

A search module 33a of the control unit 33 searches for a connectable network through the transmitting/receiving unit 31. In the case of the PLC, the network server 10 generates the join request message and transmits the join request message to the network device 20. Therefore, the search module 33a performs the search by checking the join request message. In the case of the ZigBee communication, the search module 33a receives a channel and PAN ID from the network server 10 which is a network join enable PAN coordinator through the transmitting/receiving unit 31 in the network connection procedure. That is, the search module 33a receives the network identifier from the connectable network (or the network server 10), and performs the network search.

A registration module 33b is connected to one of the networks searched for by the search module 33a as a member.

A calculation module 33c calculates the number of the networks searched for by the search module 33a. That is, the calculation module 33c calculates the number of the networks to which the network adapter 22 can be connected, and notifies the result to the registration module 33b. Here, the calculation module 33c calculates the number of the networks according to kinds of network identifiers of the networks searched for by the search module 33a. Normally, the network adapter 12 of the network server 10 can transmit the network identifier in a multiple number for a preset time. If the calculation module 33c receives the same network identifier (PAN ID and channel) in a multiple number, one network exists. If the calculation module 33c receives different network identifiers, the plurality of networks exist.

According to the calculation result of the calculation module 33c, if the connectable network is one, the registration module 33b decides that the network (namely, the network server 10) is the network to which the user intends to connect the network device 20, stores the network identifier as its network identifier, and performs the network connection to the network server 10 by using the network identifier.

Figure 7:
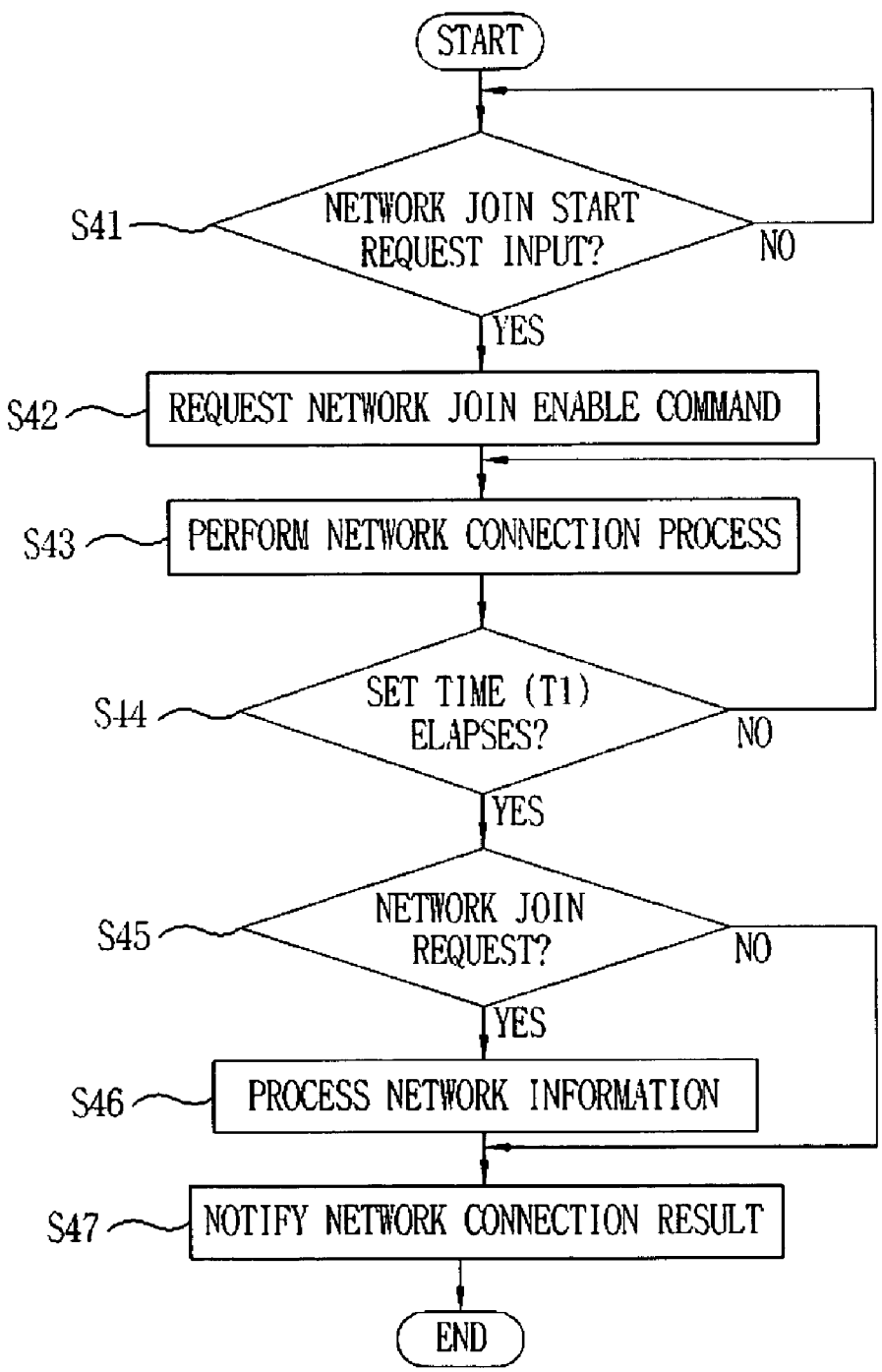
FIG. 7 is a flowchart showing driving of a network server in accordance with the present invention.
Figure 8:
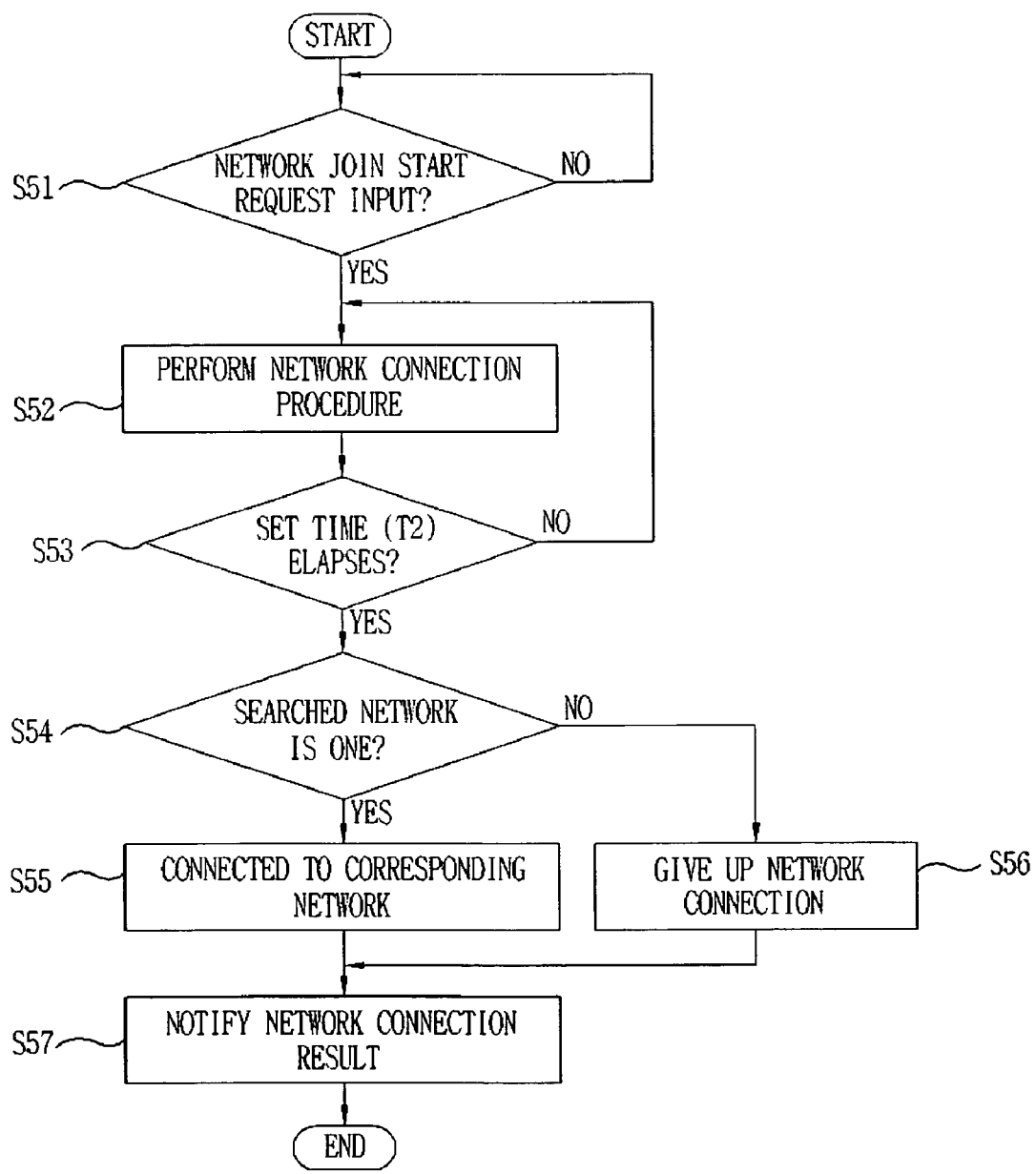
FIG. 8 is a flowchart showing driving of a network device in accordance with the present invention.

FIG. 7 is a flowchart showing driving of the network server in accordance with the present invention, and FIG. 8 is a flowchart showing driving of the network device in accordance with the present invention. This embodiment is based on the ZigBee communication.

In detail, in step S41 of FIG. 7, the microcomputer 15 of the network server 10 decides whether the user has inputted a network join start request through the input means 11. That is, the microcomputer 15 decides whether the user intends to connect the new network device 20 to the current network system to control the network device 20.

In step S51 of FIG. 8, the microcomputer 25 of the network device 20 decides whether the user has inputted a network join start request.

In step S42 of FIG. 7, the microcomputer 15 transmits a network join enable command to the network adapter 12, and the network adapter 12 converts the current state into a PAN join enable state from another network adapter.

In step S52 of FIG. 8, the microcomputer 25 makes the network adapter 22 perform a network connection procedure. The search module 33a of the network adapter 22 performs the network search.

In step S43 of FIG. 7, the network adapter 12 of the network server 10 performs a network connection process corresponding to the network connection procedure of the network adapter 22. That is, the network adapter 12 externally transmits a prestored network identifier at intervals of a predetermined time, and the search module 33a of the network adapter 22 receives the network identifier. That is, steps S43 and S52 are cooperatively carried out. The network connection procedure is performed as regulated by the ZigBee protocol.

In step S44 of FIG. 7, the network adapter 12 performs the network connection process for a set time t1. That is, the network adapter 12 maintains the network join enable state for the set time t1.

In step S53 of FIG. 8, the network adapter 22 performs the network connection procedure for a set time t2.

In step S54 of FIG. 8, the search module 33a transmits the whole searched network identifiers to the calculation module 33c, and the calculation module 33c calculates the number of the connectable networks according to the kinds of the network identifiers, and transmits the result to the registration module 33b. The registration module 33b decides whether the searched network is one. If so, the routine goes to step S55, and if not, the routine goes to step S56.

In step S55, the registration module 33b transmits a join request to the network corresponding to the received network identifier. In step S45 of FIG. 7, the network adapter 12 receives the join request. In step S46 of FIG. 7, the network adapter 12 transmits a network join enable command to the network adapter 22. The registration module 33b requests network information (for example, home code, authentication key, encryption key, etc.) to the network adapter 12. In step S46, the network adapter 12 transmits the network information to the network adapter 12. The registration module 33b stores the network information and performs the network connection.

In step S56, the registration module 33b abandons the connection to any of the networks, and removes the received network identifiers. When the plurality of networks are searched for, if the network identifier is not inputted by the user, the registration module 33b cannot identify the network which the user wants. Accordingly, the registration module 33b gives up the network connection.

In step S47 of FIG. 7, if the network adapter 12 processes the network information (receives the join request, transmits the join enable command, transmits the network information, etc.), the network adapter 12 notifies network connection success of the network device 20 to the microcomputer 15. If the network adapter 12 does not process the network information, the network adapter 12 notifies network connection failure of the network device 20 to the microcomputer 15. The microcomputer 15 notifies the network connection result through the display means 14.

In step S57 of FIG. 8, the network adapter 22 notifies network connection success to the microcomputer 25 in the case of step S55, or network connection failure to the microcomputer 25 in the case of step S56. The microcomputer 25 notifies the network connection result to the user through the display means 24. In addition, the network adapter 22 can notify the network connection result through the built-in display unit 34. In step S57, in the case of network connection failure, the network device 20 does not perform the network connection procedure again, and notifies it to the user through the display unit 34 or the display means 24. The network device 20 can also notify the user to reattempt the network connection after a predetermined time.

In accordance with the present invention, the network device 20 can be connected to the unique network by steps S54 to S56.

Figure 9:
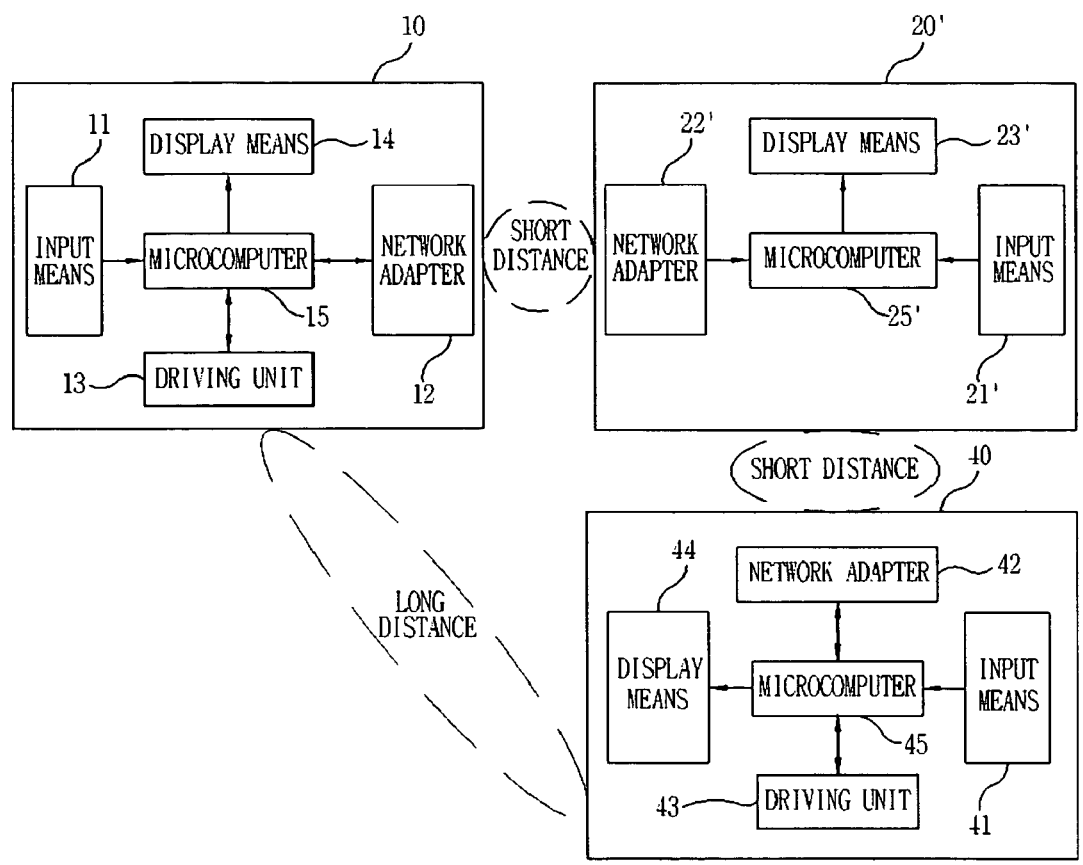
FIG. 9 is a block diagram illustrating a home network system to which a network device is applied in accordance with yet another embodiment of the present invention.

FIG. 9 is a block diagram illustrating a home network system to which a network device is applied in accordance with yet another embodiment of the present invention. The home network system includes a network server 10 for controlling and monitoring devices in a predetermined region, a remote controller 20' which is a network device performing communication with the network server 10 through a dependent transmission medium, and a network device 40 for performing communication with the network server 10 and the remote controller 20' through the dependent transmission medium, the network device 40 being intended to be newly connected to the network.

When performing the network connection, the network server 10 and the remote controller 20' perform the communication within the short distance range. The remote controller 20' and the network device 40 also perform the communication within the short distance range. Especially, when the network connection is performed between the remote controller 20' and the network device 40, the remote controller 20' serves as the network sever 10 until provision of network information. The short distance communication lowers a possibility of performing communication for the network connection with another server, not the server requested by the user.

The network server 10 is identical in structure to the network server 10 of FIG. 5.

An input means 21', a network adapter 22', a display means 23' and a microcomputer 25' of the remote controller 20' are equivalent in basic function to an input means 11, a network adapter 12, a display means 14 and a microcomputer 15 of the network server 10. Differently from the network server 10, the remote controller 20' does not perform an individual function, and thus does not need a driving unit. Especially, when the microcomputer 25' of the remote controller 20' performs the communication with the network device 40, the microcomputer 25' is operated similarly to the microcomputer 15 of the network server 10.

The network device 40 includes similar elements to those of the network server 10. Identically to the network adapter 22' of FIG. 10, a network adapter 42 of FIG. 11 performs a network security function.

Figure 10:
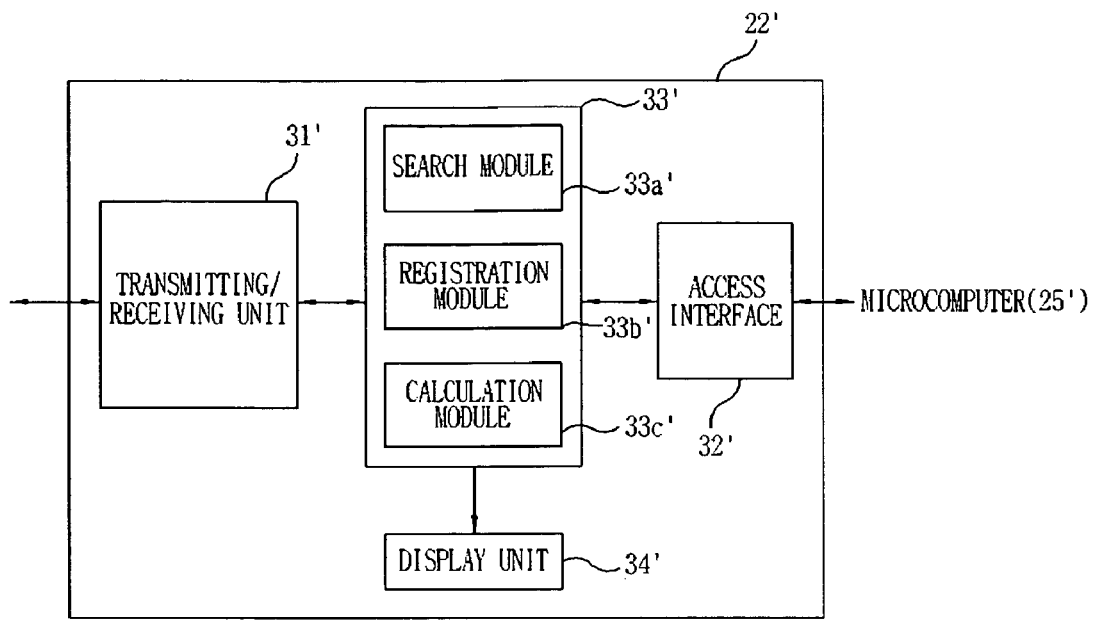
FIG. 10 is a block diagram illustrating a network adapter of a remote controller of FIG. 9.

FIG. 10 is a block diagram illustrating the network adapter of the remote controller of FIG. 9. Referring to FIG. 10, the network adapter 22' includes a transmitting/receiving unit 31' for transmitting and receiving data through the dependent transmission medium, an access interface 32' for transmitting and receiving data to/from the microcomputer 25' of the remote controller 20', and a control unit 33' for performing communication control according to a protocol based on the dependent transmission medium. The network adapter 22' can further include a display unit 34' for displaying a network connection result.

Although not illustrated in detail, the transmitting/receiving unit 31' includes a modulation unit, a demodulation unit, an amplification unit, an antenna, etc. The detailed structure of the transmitting/receiving unit 31 is easily understood by the ordinary people in the art to which the present invention pertains.

The access interface 32' is an access means for transmitting and receiving data to/from the microcomputer 25'. The access interface 32' receives commands and data from the microcomputer 25', and transmits command processing results and data from the control unit 33'.

The control unit 33' controls network connection according to a communication type based on the used protocol, and also controls the succeeding data transmission and reception. In accordance with the present invention, the process of the control unit 33' connecting the new network device, namely, the remote controller 20' to the network controlled by the network server 10 will be described in detail.

The display unit 34' displays a power supply state or an operation state (normal operation, operation error, etc.) of the network adapter 22'. If the remote controller 20' does not include a display means, the display unit 34' can display the network connection result. The display unit 34' can perform visual and audible display.

A search module 33a' of the control unit 33' searches for a connectable network through the transmitting/receiving unit 31'. The search module 33a' performs the search with minimum transmission power for the short distance communication. Therefore, the user must put the remote controller 20' within the short distance from the network server 10. Only the remote controller 20' and the network server 10 can perform the network connection by the short distance communication. In the case of the PLC, the network server 10 generates a join request message and transmits the join request message to the remote controller 20'. Therefore, the search module 33a' performs the search by checking the join request message. In the case of the ZigBee communication, the search module 33a' receives a channel and PAN ID from the network server 10 which is a network join enable PAN coordinator through the transmitting/receiving unit 31' in the network connection procedure. That is, the search module 33a' receives the network identifier from the connectable network (or the network server 10), and performs the network search.

A registration module 33b' is connected to one of the networks searched for by the search module 33a' as a member.

A calculation module 33c' calculates the number of the networks searched for by the search module 33a'. That is, the calculation module 33c' calculates the number of the networks to which the network adapter 22' can be connected, and notifies the result to the registration module 33b'. Here, the calculation module 33c' calculates the number of the networks according to kinds of network identifiers of the networks searched for by the search module 33a'. Normally, the network adapter 12 of the network server 10 can transmit the network identifier in a multiple number for a preset time. If the calculation module 33c' receives the same network identifier (PAN ID and channel) in a multiple number, one network exists. If the calculation module 33c' receives different network identifiers, the plurality of networks exist.

According to the calculation result of the calculation module 33c', if the connectable network is one, the registration module 33b' decides that the network (namely, the network server 10) is the network to which the user intends to connect the remote controller 20', stores the network identifier as its network identifier, and performs the network connection to the network server 10 by using the network identifier.

Identically to the network adapter 12 of the network server 10, the network adapter 22' transmits the network identifier to the new network device 40, so that the network connection can be performed between the remote controller 20' and the network device 40.

Figure 11:
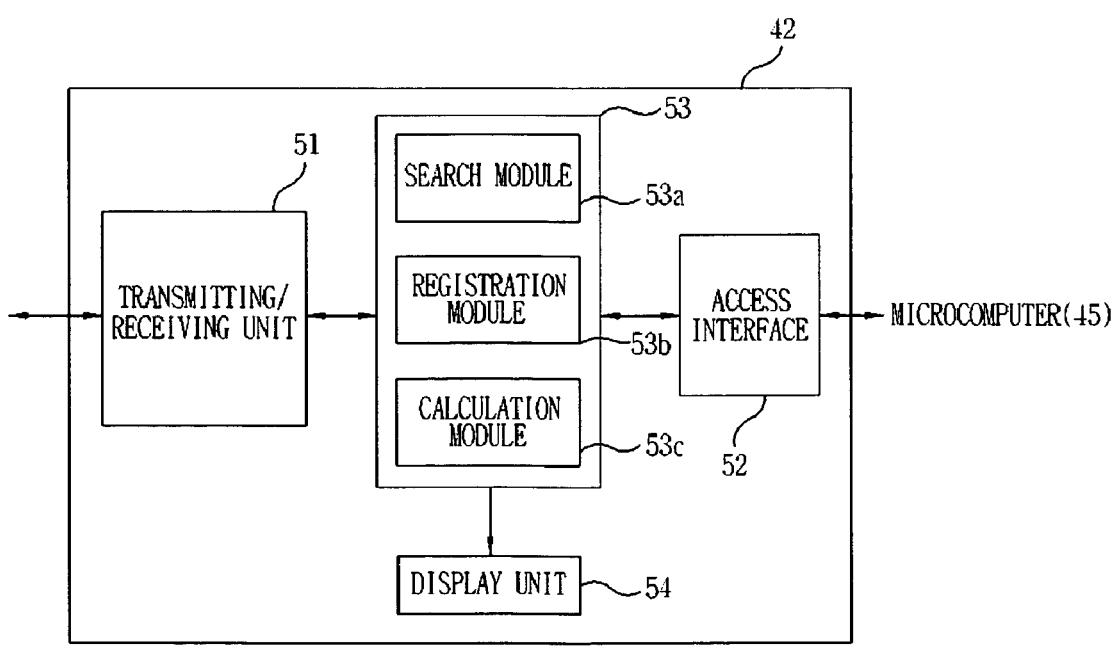
FIG. 11 is a block diagram illustrating a network adapter of a network device of FIG. 9.

FIG. 11 is a block diagram illustrating the network adapter of the network device of FIG. 9. The network adapter 42 of FIG. 11 includes the same elements as those of the network adapter 22' of FIG. 10. However, some of the elements perform different functions.

The network connection between the network device 40 and the remote controller 20' is identical to the network connection between the remote controller 20' and the network server 10. Therefore, the network adapter 42 is identical to the network adapter 22' of the remote controller 20'. However, when the network adapter 42 acquires network information by the remote controller 20', a registration module 53b transmits a message for network connection (for example, a message for looking for the server) to the network server 10 according to the network information, and the network server 10 transmits a response message. The registration module 53b receives the response message through a transmitting/receiving unit 51. When the network adapter 42 of the network device 40 acquires the network information through the remote controller 20', the network server 10 cannot identify the network device 40. Accordingly, the above operation is required.

The network server 10 and the remote controller 20' are driven in the order of FIGS. 7 and 8. The exceptional operations will now be explained.

In step S52 of FIG. 8, the microcomputer 25' makes the network adapter 22' perform a network connection procedure. The search module 33a' of the network adapter 22' performs a network search. The network adapter 22' uses minimum transmission power for the short distance communication.

In step S57 of FIG. 8, the network adapter 22' can notify a network connection result through the built-in display unit 34'. In step S57, in the case of network connection failure, the remote controller 20' does not perform the network connection procedure again, and notifies it to the user through the display unit 34' or the display means 24'. The remote controller 20' can also notify the user to reattempt the network connection after a predetermined time.

By the method of FIGS. 7 and 8, the network adapter 22' of the remote controller 20' stores the network information by the network connection, and resets the transmission power to the normal power for the succeeding communication. In FIG. 9, the user puts the remote controller 20' storing the network information within the short distance from the network device 40 intended to be newly connected to the network, and performs the network connection as shown in FIGS. 7 and 8.

Figure 12:
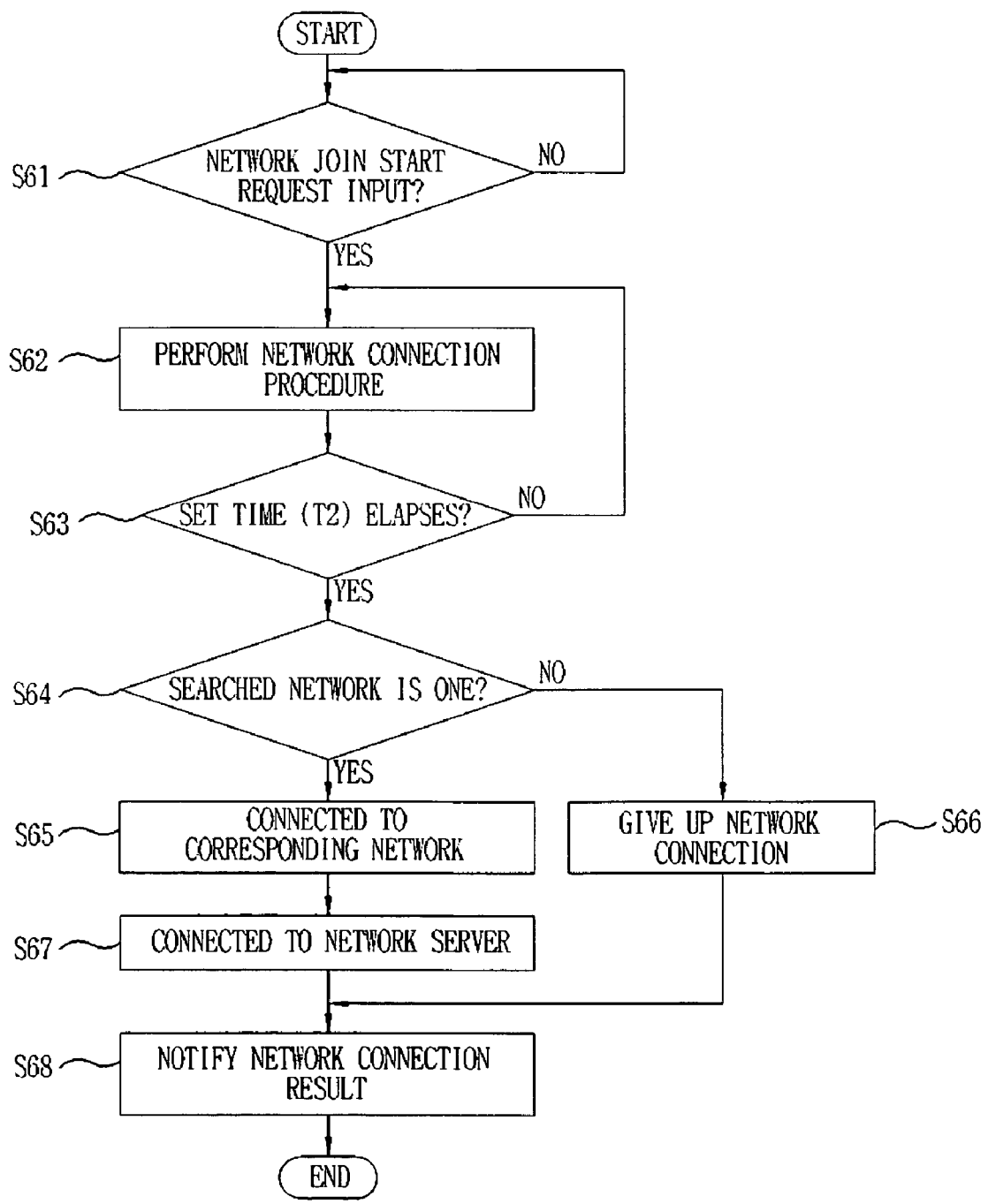
FIG. 12 is a flowchart showing driving of the network device of FIG. 9.

FIG. 12 is a flowchart showing driving of the network device of FIG. 9. The remote controller 20' performs the functions of the network server 10, and the network device 40 performs most of the functions of the remote controller 20'. That is, steps S61 to S66 of FIG. 12 are similar to steps S51 to S56 of FIG. 7.

In step S67, a registration module 53b of the network device 40 transmits a join request (for example, a message for looking for the server) to the network server 10 in a multicast method according to the received network information, and the network adapter 12 reads the network information contained in the received join request. If the network information is the network information of the network adapter 12, the network adapter 12 transmits a join enable command to the registration module 53b a unicast method, thereby connecting the network device 40 to the network server 10. Here, the network adapter 12 stores a MAC address of the network device 40.

As described above, the user puts the remote controller 20' within the short distance from the network server 10, and makes inputs corresponding to the network join start request, so that the network connection can be performed between the remote controller 20' and the network server 10. Thereafter, the user puts the remote controller 20' within the short distance from the network device 40, and makes inputs corresponding to the network join start request, so that the network connection can be performed between the network device 40 and the remote controller 20'. In addition, the network device 40 automatically performs the network connection to the network server 10. As a result, the network connection is completed between the network device 40 and the network server 10 which are distant from each other.

In accordance with the present invention, highly reliable network connection and registration are performed in the network system using the dependent transmission medium.

The corresponding network connection can be stably performed by the minimum operation of the user.

The network connection can be easily processed by reducing the moving distance of the user.

Although the preferred embodiments of the present invention have been described, it is understood that the present invention should not be limited to these preferred embodiments but various changes and modifications can be made by one skilled in the art within the spirit and scope of the present invention as hereinafter claimed.

What is claimed is:

1. A method of a network address assignment, the method comprising:
   receiving, at an electronic device, one or more messages for the network address assignment from at least one external device for a predetermined time period, wherein each of the one or more messages comprises a home code being assigned to a network corresponding to the at least one external device and being used for discriminating one network from another network; and
   when all of the one or more messages are sent by a single external device, performing, at the electronic device, the network address assignment based on the home code included in the one or more messages.

2. The method of claim 1, further comprising:
   when the electronic device performs the network address assignment, performing, at the electronic device, a registration operation.

3. The method of claim 2, further comprising:
   notifying, at the electronic device, a result of the network address assignment.

4. The method of claim 1, further comprising:
   receiving, at the electronic device, an input,
   wherein after the electronic device receives the input, the electronic device receives the one ore more messages for the predetermined time period.

5. The method of claim 1, wherein the at least one external device comprises a first external device, and the one or more messages comprise one or more first messages, and wherein the one or more first messages which include a first home code corresponding to the first external device are sent by the first external device repeatedly by a first predetermined time interval.

6. The method of claim 5, wherein the at least one external device further comprises a second external device, and the one or more messages further comprises one or more second messages, and wherein the one or more second messages which include a second home code corresponding to the second external device are sent by the second external device repeatedly by a second predetermined time interval.

7. The method of claim 1, wherein the electronic device extracts the home code from the one or more received messages.

* * * * *